(12) United States Patent
Forutanpour

(10) Patent No.: US 10,520,348 B2
(45) Date of Patent: Dec. 31, 2019

(54) APPARATUS FOR FOOD PREPARATION

(71) Applicant: Babak Forutanpour, Carlsbad, CA (US)

(72) Inventor: Babak Forutanpour, Carlsbad, CA (US)

(*) Notice: Subject to any disclaimer, the term of this patent is extended or adjusted under 35 U.S.C. 154(b) by 0 days.

(21) Appl. No.: 16/270,087

(22) Filed: Feb. 7, 2019

(65) Prior Publication Data

US 2019/0353511 A1  Nov. 21, 2019

Related U.S. Application Data

(60) Provisional application No. 62/671,430, filed on May 15, 2018.

(51) Int. Cl.
| | |
|---|---|
| *G01F 19/00* | (2006.01) |
| *A47J 9/00* | (2006.01) |
| *A47J 47/16* | (2006.01) |
| *A47J 43/07* | (2006.01) |
| *A47J 43/14* | (2006.01) |

(52) U.S. Cl.
CPC ............. *G01F 19/00* (2013.01); *A47J 9/003* (2013.01); *A47J 43/0727* (2013.01); *A47J 43/14* (2013.01); *A47J 47/16* (2013.01)

(58) Field of Classification Search
CPC .. G01F 19/00; A47J 9/003; A47J 43/14; A47J 43/16
See application file for complete search history.

(56) References Cited

U.S. PATENT DOCUMENTS

| | | | | |
|---|---|---|---|---|
| 1,848,450 | A | * | 3/1932 | Williamson ............ A47L 13/50 15/264 |
| 3,163,385 | A | * | 12/1964 | Lazan, Jr. ............... A47J 47/16 248/37.6 |
| 8,034,433 | B2 | * | 10/2011 | Fai ........................... B43L 1/00 206/217 |
| 2008/0149634 | A1 | * | 6/2008 | Osborne .............. A47G 21/145 220/23.83 |
| 2015/0060469 | A1 | * | 3/2015 | Renkola ............... A47G 21/145 220/574.1 |
| 2018/0325321 | A1 | * | 11/2018 | Monk .................... A47J 43/287 |
| 2019/0053670 | A1 | * | 2/2019 | Taylor .................... A47J 47/005 |

\* cited by examiner

*Primary Examiner* — Jamel E Williams

(57) ABSTRACT

An apparatus and method are described for conveniently food preparation. The food preparation apparatus may sit directly over a bowl. The apparatus may comprise, amongst other things, a waste receptacle and a measuring tray.

20 Claims, 8 Drawing Sheets

APPARATUS FOR FOOD PREPARATION

CLAIM TO PRIORITY UNDER 35 U.S.C. § 119

The present Application for Patent claims the benefit of U.S. Provisional Application No. 62/671,430 filed on May 15, 2018, entitled, "Multipurpose Baking Utensil," owned by the applicant hereof, and expressly incorporated herein by reference in its entirety.

BACKGROUND

I. Field

The disclosed embodiments relate to an apparatus for food preparation.

II. Background

There exist a wide range of measuring cups and spoons on the market today which allow one to measure ingredients when baking, cooking or other food preparation tasks. It would be advantageous to have a single apparatus which could be used to measure a plurality of ingredients, in conjunction, if so desired, versus the need to purchase, store, retrieve, use, clean and put back with multiple tools. In addition, it would be desirable to have the measuring apparatus that allowed one to measure liquids or powders, cut solids and crack eggs directly over the mixing bowl, minimizing any messy cleanups that might be made on the counter otherwise.

SUMMARY

Methods and apparatuses for removably a food preparation apparatus are described. In an embodiment, an apparatus for food preparation is described, comprising: a crescent shaped base configured to rest on the rim of a bowl; a receptacle attached to the crescent shaped base, the receptacle positioned outward laterally from the crescent shaped base; a crescent shaped measuring tray, the crescent shaped measuring tray configured to rest on top of the crescent shaped base.

In another embodiment, a food preparation apparatus is described comprising: means for allowing the food preparation apparatus to rest on the rim of a bowl; means for receiving waste; means for measuring ingredients; means for dumping the measured ingredients into the bowl;

BRIEF DESCRIPTION OF THE DRAWING

The following embodiments may be better understood by referring to the following figures. The figures are presented for illustration purposes only, and may not be drawn to scale or show every feature, orientation, or detail of the embodiments. They are simplified to help one of skill in the art understand the embodiments readily, and should not be considered limiting.

DETAILED DESCRIPTION

Each of the additional features and teachings disclosed below may be utilized separately or in conjunction with other features and teachings to provide a method, apparatus, and system for food preparation. Representative examples of the following embodiments will now be described in further detail with reference to the attached drawings. This detailed description is merely intended to teach a person of skill in the art details for practicing the preferred aspects of the teachings and is not intended to limit the scope of the embodiments.

The disclosed embodiments describe in general a crescent shaped food preparation apparatus that may have a plurality of measuring cups such that the apparatus may fit over a variety of different sized mixing bowls. Crescent shaped, herein, meaning not necessarily strictly a crescent shape, but shapes that include shapes in the arch family. In an embodiment, the apparatus may have an utility feature such as to cut cubes of butter (for example, other solids may be cut as well: e.g. chocolate, lard, bananas) over the bowl such that the cut portion may fall directly into the mixing bowl, a vertical utility tab which protrudes upwards allowing users to crack eggs directly over the bowl, a recipe holder, an area to hold mixing spoons of plurality of sizes, and a waste receptacle that may minimize frequent trips to the kitchen's trashcan. In an embodiment, the measuring cups may have a plurality of drainage holes by them, whereby any excess ingredients poured into the cups may then overflow down the outside of the measuring cup through these drainage holes and into a second waste receptacle. In an embodiment, the measuring cups may be part of a measuring tray and may not be attached to the base and a user may be able to lift the measuring tray to dump the ingredients into the bowl. In an embodiment, the measuring tray may be attached to the base via magnets or hinge, whereby the user may tilt the measuring tray over into a bowl, thus, dumping their contents.

Figure 1:
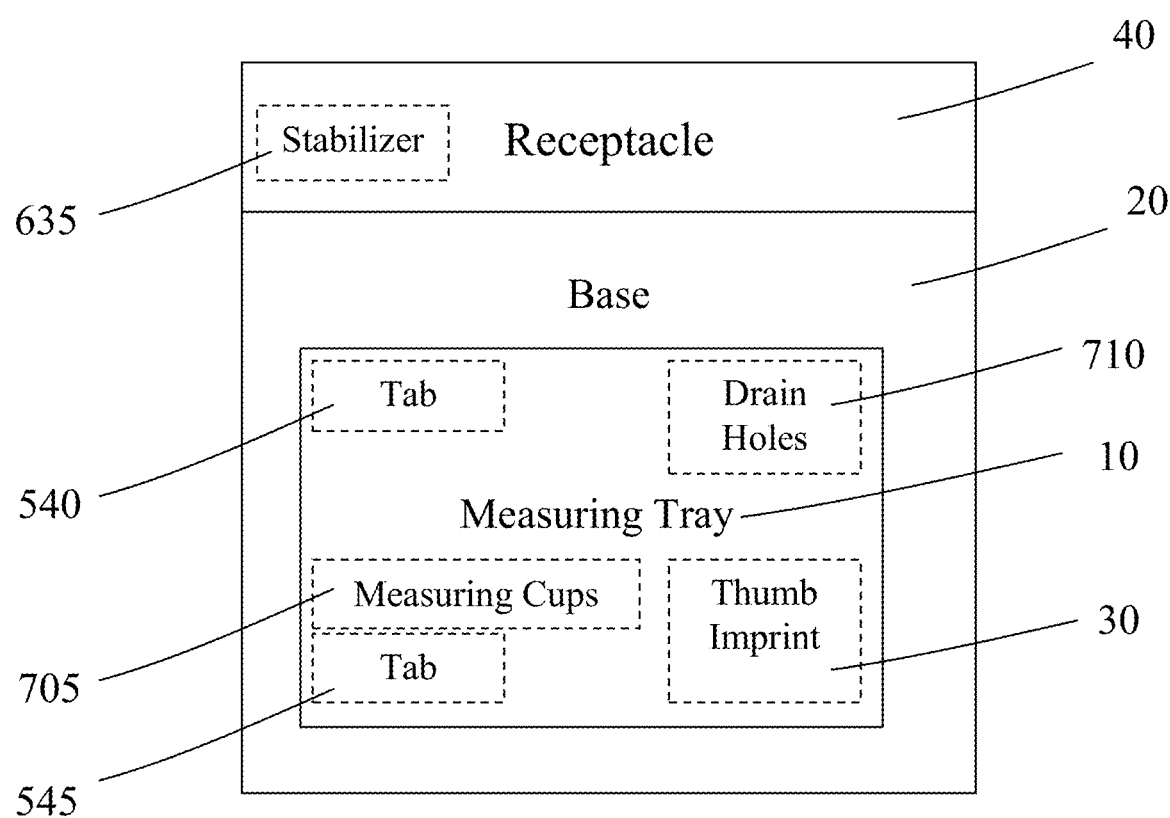
FIG. 1 illustrates a food preparation apparatus in an embodiment.

FIG. 1 food preparation apparatus 100 in an embodiment. In an embodiment, food preparation apparatus 100 may comprise a base 20 that may house a measuring tray 10 and be configured to "sit" on the rim of a bowl. Food preparation apparatus may also comprise a receptacle 40 attached to the base 20. The receptacle may be used for disposing of waste items. The base 20, and receptacle 40 may be modular and attached by linking the modular parts together (e.g. snap joints) to form the food preparation apparatus, or they may be molded into a single piece. Food preparation apparatus may also comprise a thumb imprint(s) 30 allowing the measuring tray to be conveniently lifted, tilted or otherwise moved in order to dump its contents into a mixing bowl. The food preparation apparatus 100 may be made of plastic, wood, metal, polymers, Plexiglas, rubber, latex, or any combinations thereof. Food preparation apparatus 100 may optionally comprise additional features as described in more detail below.

Figure 2A:
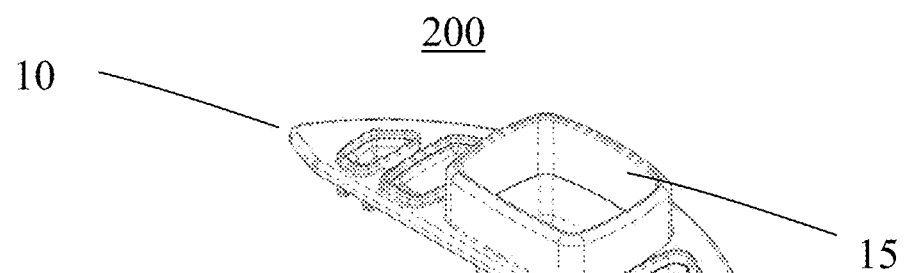
FIG. 2A illustrates a measuring tray in an embodiment.
Figure 2B:
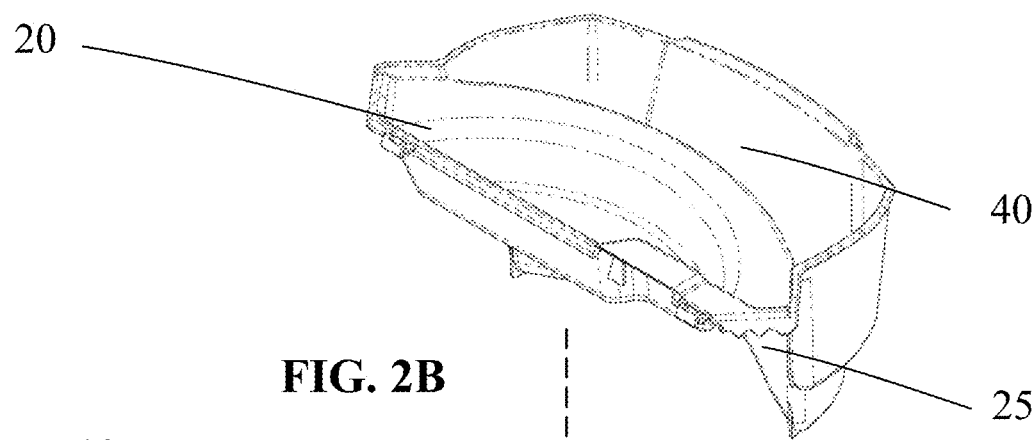
FIG. 2B illustrates a base and a receptacle in an embodiment.
Figure 2C:
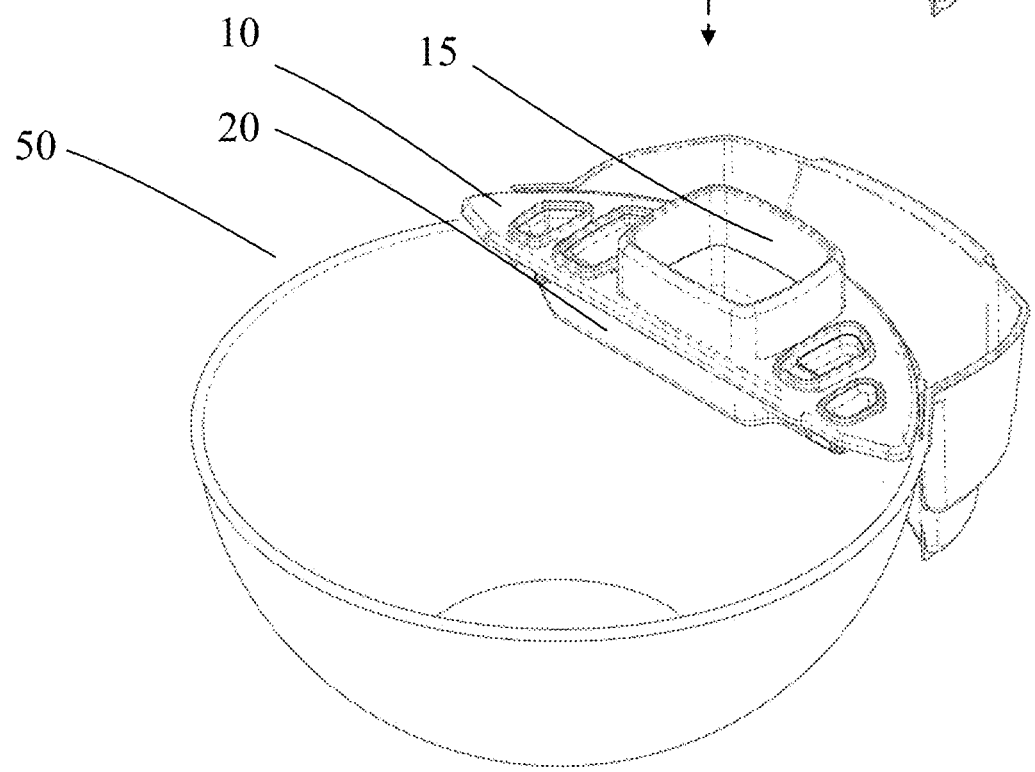
FIG. 2C illustrates a food preparation apparatus in an embodiment.

FIG. 2C illustrates a food preparation apparatus in an embodiment placed over a bowl 50. The food preparation apparatus 200 may comprise a crescent shaped measuring tray 10 as shown for clarity in FIG. 2A. The crescent shaped measuring tray 10 may comprise one, or a plurality of measuring cups 15. The food preparation apparatus 200 may comprise a crescent shaped base 20 as shown in FIG. 2B for clarity. The crescent shaped base 20 may have a concave interior (or "bowl" or "box" like characteristics), house the crescent shaped measuring tray and "sit" on the rim of a bowl. In an embodiment, the crescent shaped base 20 may comprise grooves that may have different arc lengths, allowing it to fit over bowls of different diameters and edge widths. Groove/s 25 may help secure the apparatus 200 over the bowl in that they may provide support and increase friction and may help minimize the motion of the apparatus over the bowl. The food preparation apparatus 200 may also comprise a receptacle 40 as shown for clarity in FIG. 2B. The depth of the crescent shaped base 20 and the receptacle 40 may be designed such that when the food preparation apparatus 200 is placed over a bowl it may balance and support its own weight, as the base 20 and receptacle 40 may act as physical stops to rotation forces.

Figure 3A:
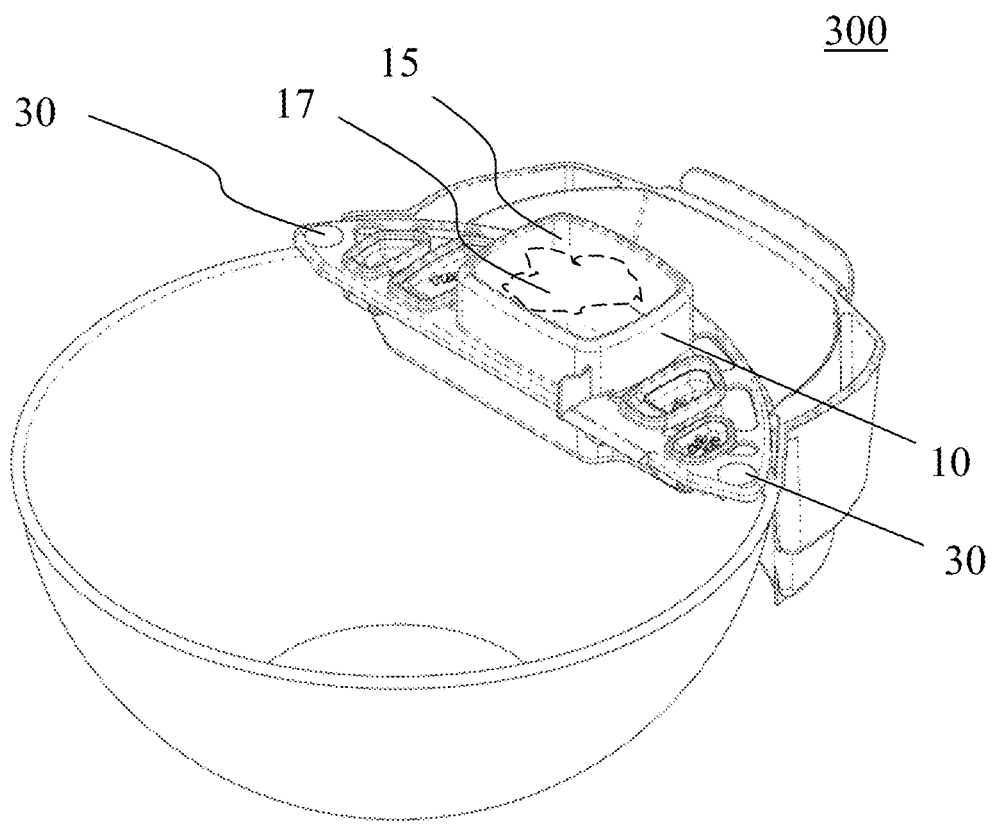
FIG. 3A illustrates a food preparation apparatus with a "loaded" measuring tray in an embodiment
Figure 3B:
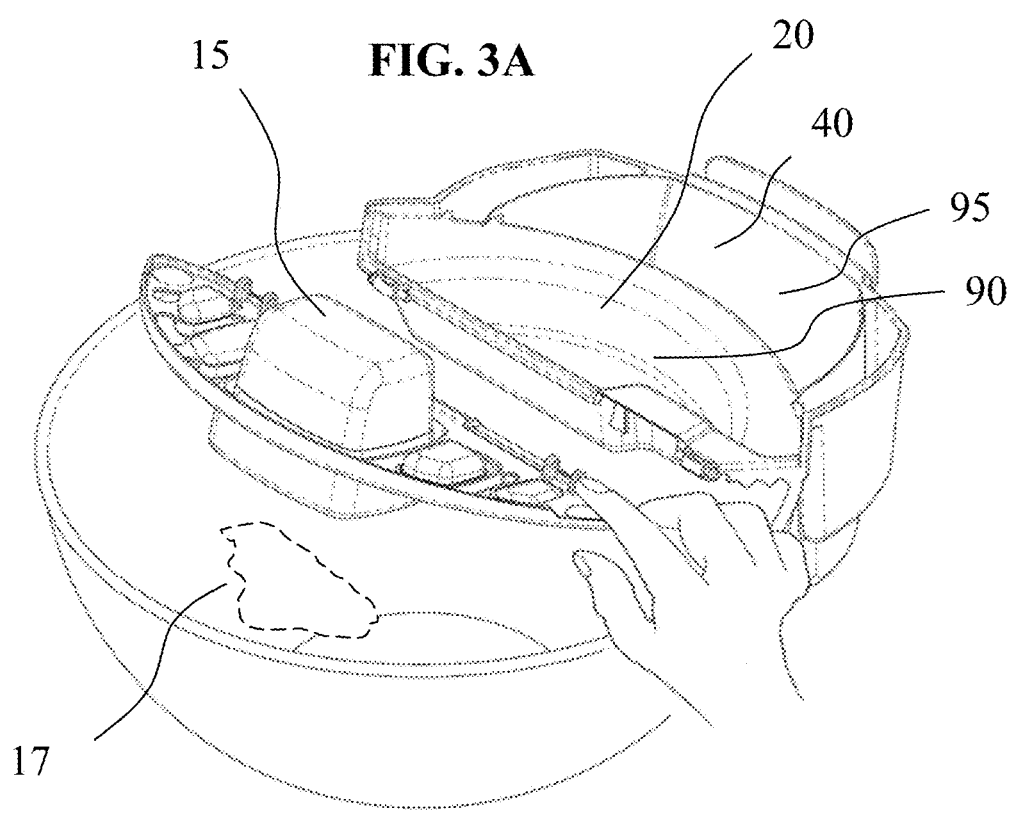
FIG. 3B illustrates a food preparation apparatus with a measuring tray being "dumped" in an embodiment.

FIG. 3A illustrates a food preparation apparatus 300 with a "loaded" measuring tray 10 in an embodiment. As illustrated here, measuring cup 15 has some ingredients 17 poured into it. A user may for example, add ingredients to one or more than one measuring cup on the measuring tray. For example, a user may add sugar, flour, and salt to the measuring cups. The food preparation apparatus 300 may comprise one, or more than one, finger (or thumb) imprints 30 which the user may use to grasp the measuring tray 10. In an embodiment, imprints 30 may be textured or comprise a non-slip material. FIG. 3B illustrates a food preparation apparatus with a measuring tray being "dumped" in an embodiment. As illustrated in FIG.3B, the user may then "dump" the contents 17 into the bowl either by lifting a non-attached measuring tray 10 out from the base 20, or by tilting an attached measuring tray 10 (e.g. hinged) from the base 20. In a hinged embodiment, the tray may be configured to rotate upward away from the crescent shaped base into the bowl between 0-195 degrees. In an embodiment, receptacle 40 may or may not be crescent shaped. Base 20 and Receptacle 40 may be configured to have a concave ("bowl" or "box" like) characteristics 90 and 95 (respectively). In an embodiment, receptacle 40 may comprise one or more than one compartments.

Figure 4:
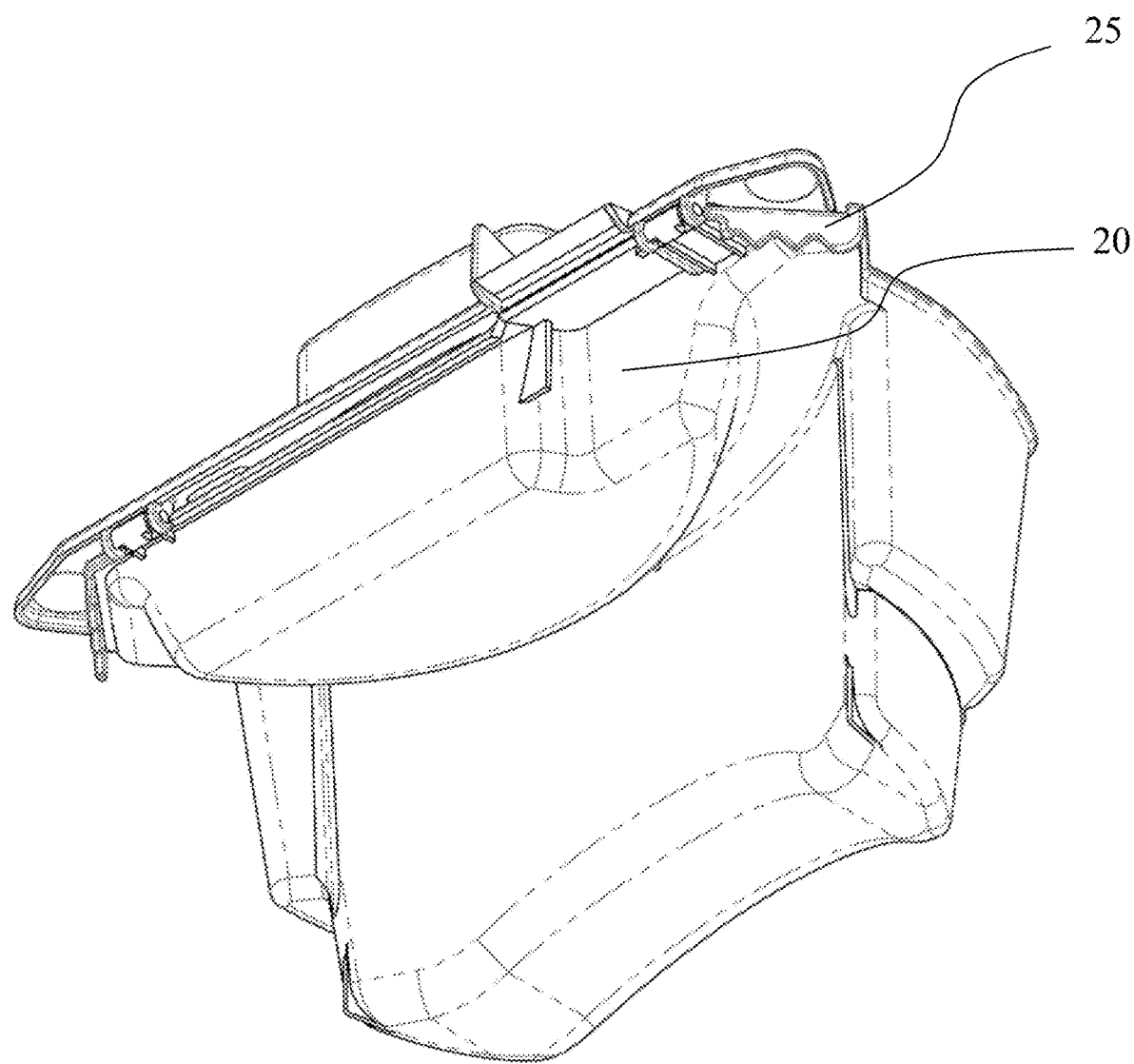
FIG. 4 illustrates a bottom view perspective of a food preparation apparatus in an embodiment.

FIG. 4 illustrates a bottom view perspective of a food preparation apparatus 400 in an embodiment. In an embodiment, there may be one or more than one grooves 25, located on the bottom portion of the base 20. The grooves may be configured (e.g. shaped) to help the food preparation apparatus 400 "sit" securely onto the rim of a bowl, regardless of the bowl's diameter. For example, there may be a plurality of grooves varying in arch length, depth and/or shape. For example, a groove, or all groves, or any combinations thereof, may be shaped as a "U," "V," open square, clithridiate, hippocrepiform, or other appropriate shape.

Figure 5:
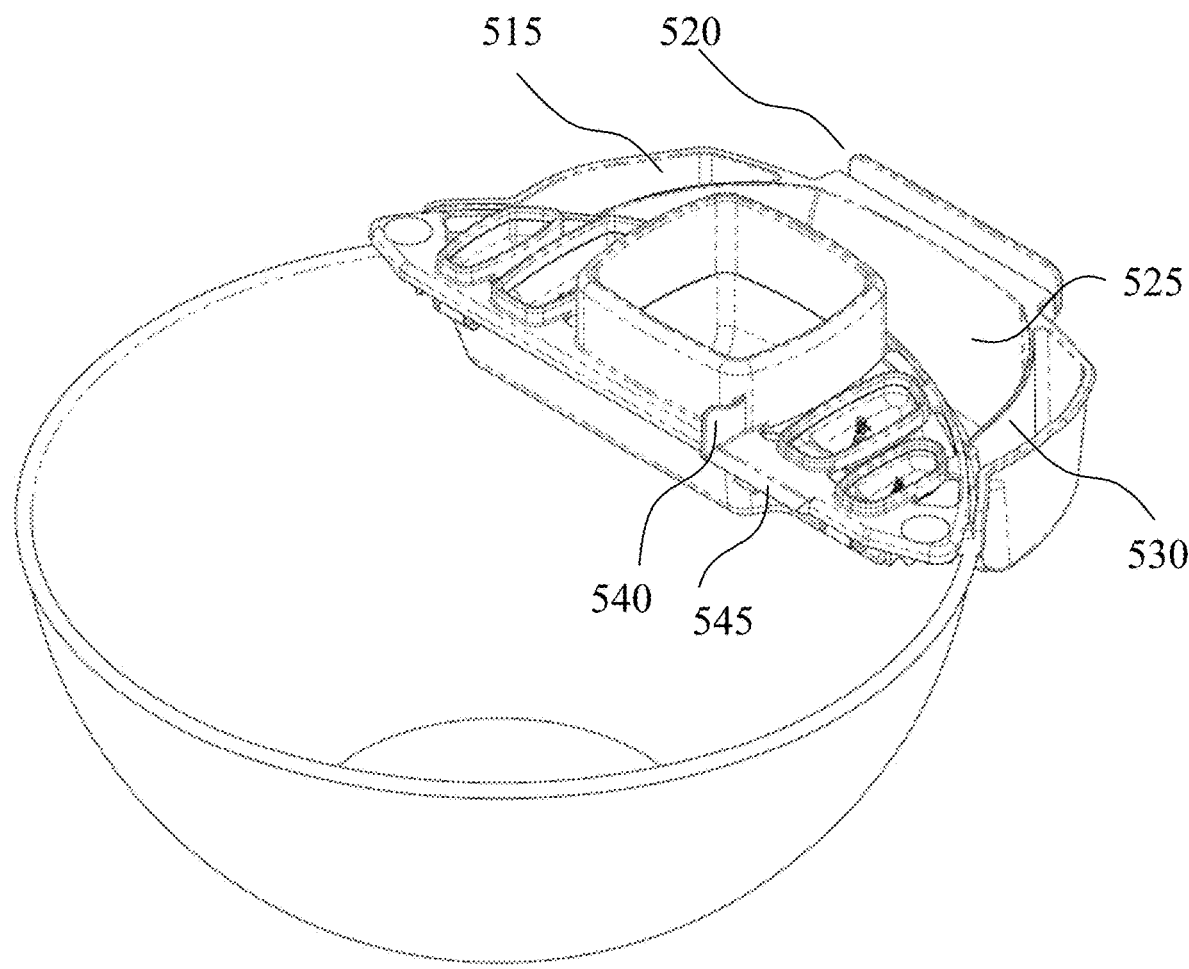
FIG. 5 illustrates a food preparation apparatus placed over a mixing bowl in an embodiment.

FIG. 5 illustrates a food preparation apparatus 500 placed over a mixing bowl in an embodiment. In an embodiment, the user may place a recipe card in slot 520, thus, freeing their hands while they measure, add and mix ingredients. In an embodiment, the slot 520 may be configured to hold a recipe card with some friction. In another embodiment, the slot 520 may be configured to be wide enough to hold multiple recipe cards or allow a recipe card to rest in the slot without friction coupling. In an embodiment, the slot 520 may be large and strong enough to hold a recipe book or magazine. In an embodiment, the slot 520 may be curved such that introducing a curve to the recipe card provides structure that may help prevent the card from falling. In another embodiment, utility tab 545 may be sharp enough (but blunt enough as to not cut a user's skin etc.) to allow the user to cut a cube of butter such that the measured portion drops directly into the bowl. Utility tab 545 may be used for opening packages or other similar uses. Receptacle 525 (shown here as three separate compartments) may be used for discarding wastes. For example, the excess paper wrapper from the butter cut using utility tab 545 may be discarded into waste receptacle 525. In another embodiment, receptacle areas (or compartments) 515 and 530 may be used to hold mixing spoons or other items which one would like to keep off the counter top, but does not wish to place in waste receptacle 525. In an embodiment, receptacle compartments 515 and 530 may be used for separating wastes: e.g. compost from paper. In other words receptacle 40 may be configured with one or more than one compartments for a variety of user preferences. In yet another embodiment, the figure illustrates a vertical utility tab 540 where a user may use the vertical utility tab 540 to crack an egg directly over the bowl, ensuring all the yolk falls into the bowl and not the countertop. The user may place the egg shells into waste receptacle 525, avoiding trips to the kitchen's trash.

Figure 6A:
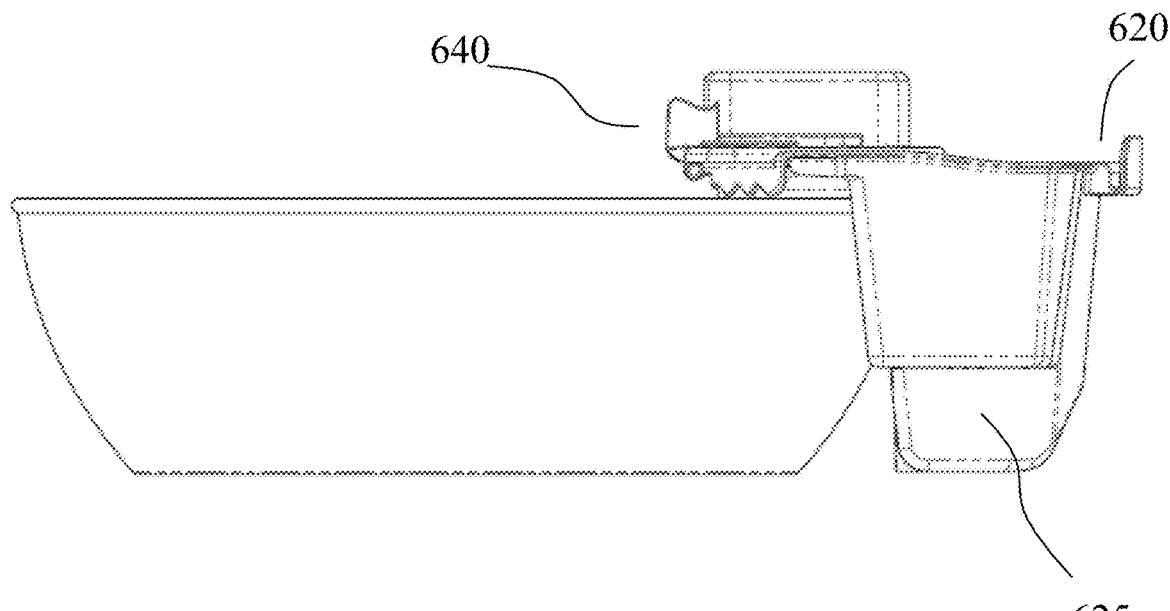
FIG. 6A illustrates a side perspective of a food preparation apparatus placed over a mixing bowl in an embodiment.
Figure 6B:
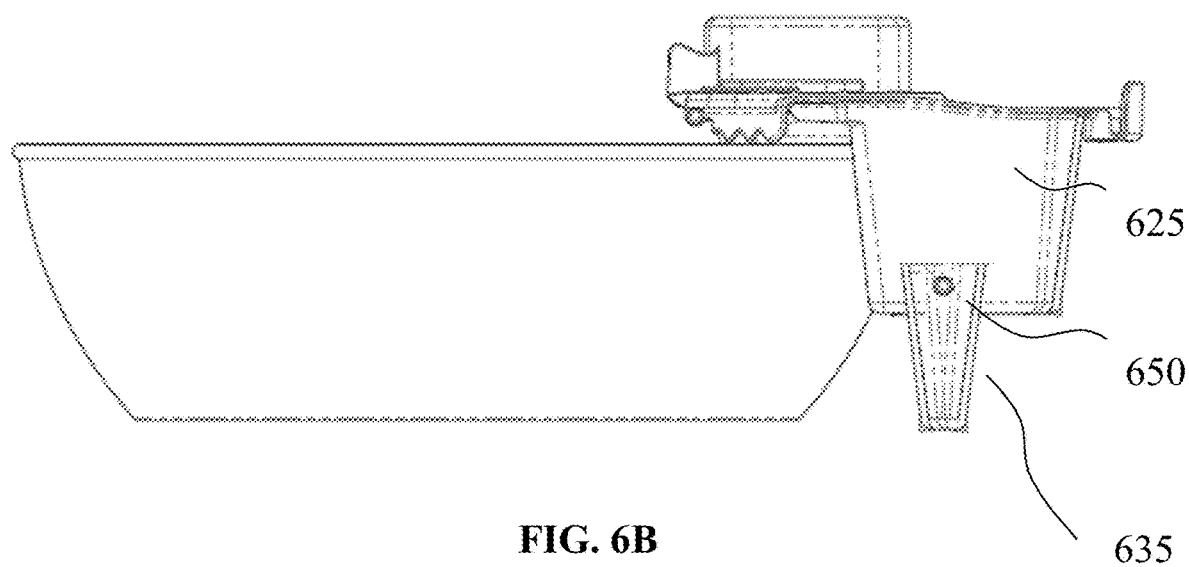
FIG. 6B illustrates a side perspective of a food preparation apparatus placed over a mixing bowl in another embodiment.

FIG. 6A illustrates a side perspective of a food preparation apparatus 600 placed over a mixing bowl. In this embodiment, one can see the recipe card holder 620 in an non-friction embodiment, vertical utility tab 640, and waste receptacle 625 more clearly. In another embodiment, the depth of the waste receptacle 625 may be designed to consider the height of a typical mixing bowl in order to help support its own weight when loaded. For example, when receptacle 625 is loaded (has more weight), then the food preparation apparatus 600 will want to rotate downwards outside the bowl and into the bowl's outer side because the bowl's rim is basically the food preparation's pivot point. Thus, the depth of receptacle 625 will be a physical stop to the downward rotation of the apparatus 600, as the receptacle 625 will run up against the bowl's outer side to rest. An opposite effect may likewise be configured for the measuring tray and base portions: if they are heavier than the receptacle area the food preparation apparatus 600 will want to rotate downwards inside the bowl. However, the depth of the base 20 will be a physical stop and prevent the food preparation apparatus 600 from rotating inwards and come to rest on the side of the bowl's inward side. In another embodiment, as illustrated in FIG. 6B, a kickstand may be attached to the receptacle 625 in order to provide more stability. For example, a kickstand 635 may be hinged 650 and rotate up to a non-engaged position, and then rotated downward into an engaged position.

Figure 7:
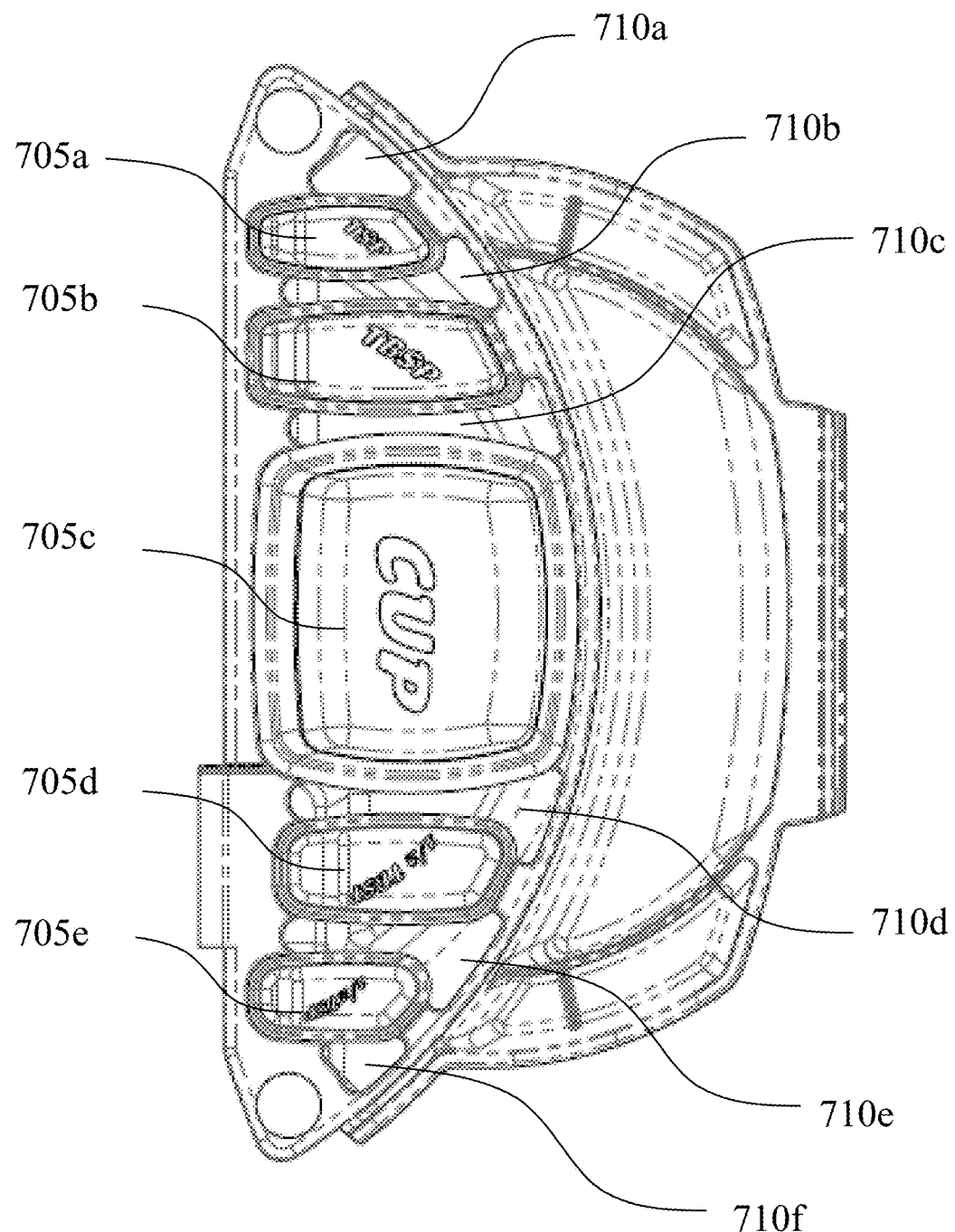
FIG. 7 illustrates a top perspective of a food preparation apparatus 700 in an embodiment.

FIG. 7 illustrates a top perspective of a food preparation apparatus 700 in an embodiment. In an embodiment, measuring cups 705*a-e* may be labeled with indications of common measuring units: e.g. metric, volume, weight, or mass other commonly used cooking units. For example, measuring cup 705*a* may be labeled "TSP," to denote a teaspoon and have a line indication inside the cup 705*a* for the user to know where a teaspoon is at. Other indications for measuring cups 705*a-e* may be used: e.g. colors, vertical or horizontal lines, or the top level of the cup may be the indicator (actual size (volume) of the cup is the measuring unit). In an example, cup 705b may be labeled as "TBSP" to denote tablespoon, 705c may be labeled "CUP" to denote a measuring cup, 705d may be labeled "½ TBSP" to denote half a tablespoon, and 705e may be labeled "½ TSP" to denote half a teaspoon and so forth. In an embodiment, the cups may be designated with different colors which may match the colors used by a recipe. For example, the recipe may call for "two blue scoops of sugar," which may be designated on the apparatus as two tablespoons of sugar. In an embodiment, near the cups 705a-e may be located drain holes 710a-f. These holes may ensure that if the user poured more liquid, powder or solid than required, the excess will spill over their walls into the base 20 concave area whose contents do not get poured into the bowl at any time.

Figure 8:
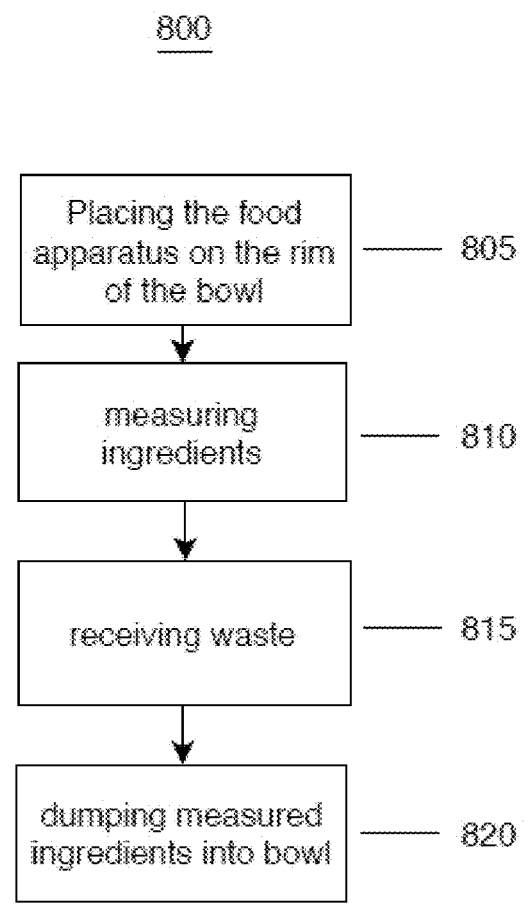
FIG. 8 illustrates a method of using a food preparation apparatus in an embodiment.

FIG. 8 illustrates a method of using a food preparation apparatus 800 in an embodiment. Any of the described embodiments or their equivalents may be used for a food preparation apparatus 800 comprises: means for allowing the food preparation apparatus to rest on the rim of a bowl 805 and placing the apparatus 800 in the rim of a bowl; means for measuring ingredients 810 and measuring ingredients; means for receiving waste 815 and discarding waste into a receptacle; and means for dumping the measured ingredients into the bowl and dumping the measured ingredients into the bowl 820.

The foregoing description of the preferred embodiments has been presented for purposes of illustration and description. It is not intended to be exhaustive or to limit the embodiments to the precise form or to exemplary embodiments disclosed. Obviously, many modifications and variations will be apparent to practitioners skilled in this art. Similarly, any process steps described might be interchangeable with other steps in order to achieve the same result. The embodiments were chosen and described in order to best explain the principles of the embodiments and its best mode practical application, thereby to enable others skilled in the art to understand the various embodiments and with various modifications as are suited to the particular use or implementation contemplated. It is intended that the scope of the embodiments be defined by the claims appended hereto and their equivalents. Reference to an element in the singular is not intended to mean "one and only one" unless explicitly so stated, but rather means "one or more." Moreover, no element, component, nor method step in the described disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

In addition, the conjunction "and" when used in the claims is meant to be interpreted as follows: "X, Y and Z" means it may be either X, Y or Z individually, or it may be both X and Y together, both X and Z together, both Y and Z together, or all of X, Y, and Z together.

It should be understood that the figures illustrated in the attachments, which highlight the functionality and advantages of the described embodiments, are presented for example purposes only. The architecture of the described embodiments are sufficiently flexible and configurable, such that it may be utilized and combined (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the described embodiments in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the embodiments described herein may be implemented in different systems without departing from the embodiments. It should be noted that the foregoing embodiments are merely examples and are not to be construed as limiting the embodiments. The description of the embodiments is intended to be illustrative, and not to limit the scope of the claims. As such, the described teachings may be readily applied to other types of apparatuses and many alternatives, modifications, and variations will be apparent to those skilled in the art.

What is claimed is:

1. An apparatus for food preparation, comprising:
   a crescent shaped base configured to rest on the rim of a bowl;
   a receptacle attached to the crescent shaped base, the receptacle positioned outward laterally from the crescent shaped base;
   a crescent shaped measuring tray, the crescent shaped measuring tray configured to rest on top of the crescent shaped base.

2. The apparatus of claim 1, wherein the crescent shaped measuring tray is hinged to the crescent shaped base, the hinged attachment allowing the crescent shaped measuring tray to rotate upward away from the crescent shaped base into the bowl between 0-195 degrees.

3. The apparatus of claim 1, wherein the crescent shaped measuring tray comprises a plurality of affixed measuring cups.

4. The apparatus of claim 1, wherein the crescent shaped measuring tray comprises five affixed measuring cups.

5. The apparatus of claim 3, wherein the plurality of affixed measuring cups vary in size.

6. The apparatus of claim 3, wherein the plurality of affixed measuring cups comprise a size selected from the following: a teaspoon, a tablespoon, a cup, a half cup, a half teaspoon, a half tablespoon, a fourth of a cup, and a third of a cup.

7. The apparatus of claim 3, wherein the plurality of affixed measuring cups have indications of metric, volume, weight, and mass cooking units.

8. The apparatus of claim 1, wherein the crescent shaped measuring tray comprises at least one thumb imprint.

9. The apparatus of claim 1, wherein the crescent shaped measuring tray comprises a plurality of drain holes.

10. The apparatus of claim 1, wherein the crescent shaped measuring tray comprises a utility tab.

11. The apparatus of claim 1, wherein the crescent shaped measuring tray comprises a vertical utility tab.

12. The apparatus of claim 1, wherein the receptacle comprises three separate compartments, two smaller compartments towards the sides and one larger compartment towards the middle of the receptacle.

13. The apparatus of claim 1, wherein the crescent shaped base further comprises a plurality of grooves of varying arc lengths, the various arc lengths configured to accommodate a plurality of different bowl sizes.

14. The apparatus of claim 13, wherein the plurality of grooves comprise a shape selected from the following: a "U", a "V", a clithridiate, and a hippocrepiform.

15. The apparatus of claim 1, wherein the receptacle further comprises a stabilizer.

16. A food preparation apparatus comprising:
means for allowing the food preparation apparatus to rest on the rim of a bowl;
means for receiving waste;
means for measuring ingredients; and
means for dumping the measured ingredients into the bowl.

17. The food preparation apparatus of claim 16, further comprising:
means for allowing excess ingredients to fall through into a waste receiving area.

18. The food preparation apparatus of claim 16, further comprising:
means for cracking an egg open; and
means for cutting butter.

19. The food preparation apparatus of claim 16, further comprising:
means for holding a recipe.

20. The food preparation apparatus of claim 16, further comprising:
means for holding spoons.

* * * * *